US012343755B2

(12) United States Patent
Le-Strat et al.

(10) Patent No.: US 12,343,755 B2
(45) Date of Patent: Jul. 1, 2025

(54) INSTALLATION FOR THE APPLICATION OF A COATING PRODUCT AND METHOD FOR CONTROLLING SUCH AN INSTALLATION

(71) Applicant: EXEL INDUSTRIES, Epernay (FR)

(72) Inventors: Cédric Le-Strat, Epernay (FR); Ilhan Tel, Epernay (FR)

(73) Assignee: EXEL INDUSTRIES, Epernay (FR)

( * ) Notice: Subject to any disclaimer, the term of this patent is extended or adjusted under 35 U.S.C. 154(b) by 100 days.

(21) Appl. No.: 18/333,157

(22) Filed: Jun. 12, 2023

(65) Prior Publication Data

US 2023/0398566 A1 Dec. 14, 2023

(30) Foreign Application Priority Data

Jun. 14, 2022 (FR) ....................................... 2205743

(51) Int. Cl.

| | |
|---|---|
| ***B05C 11/10*** | (2006.01) |
| ***B05B 12/00*** | (2018.01) |
| ***B05B 12/08*** | (2006.01) |
| ***B05C 5/02*** | (2006.01) |
| *B05B 13/04* | (2006.01) |

(52) U.S. Cl.

CPC ........ *B05C 11/1007* (2013.01); *B05B 12/008* (2013.01); *B05B 12/085* (2013.01); *B05C 5/0279* (2013.01); *B05B 13/0431* (2013.01)

(58) Field of Classification Search

CPC . B05C 11/10; B05C 11/1007; B05C 11/1013; B05B 12/008; B05B 12/081

USPC .............................................................. 427/8

See application file for complete search history.

(56) References Cited

U.S. PATENT DOCUMENTS

2009/0244131 A1* 10/2009 Shibata ................ B41J 2/14233 347/9
2019/0184419 A1* 6/2019 Tomita .................. B05C 5/0208
2019/0337001 A1 11/2019 Fritz et al.

FOREIGN PATENT DOCUMENTS

| | | |
|---|---|---|
| DE | 8904972 U1 | 1/1990 |
| EP | 2574471 A1 | 4/2013 |
| EP | 2974868 * | 1/2016 |

(Continued)

OTHER PUBLICATIONS

FR 2205743, INPI Rapport de Recherche Preliminaire, Jan. 19, 2023, 2 pages.

*Primary Examiner* — Austin Murata
(74) *Attorney, Agent, or Firm* — Soquel Group LLC

(57) ABSTRACT

This installation for application of a coating product comprises a print head equipped with a plurality of nozzles each controlled by a valve supplied by a product source. A product accumulator, installed on a product circulation circuit, comprises a deformable or movable wall delimiting, at least in part, a first chamber of variable volume supplied with coating product and a second variable-volume chamber supplied with gas, under a predetermined pressure equal to a nominal operating pressure of the print head. The first chamber of variable volume is supplied or purged with coating product due to a difference between an instantaneous coating product ejection rate from the print head and a supply rate to the print head from the source. A control unit adjusts an operation setpoint value of the source as a function of the difference between instantaneous ejection flow rate and supply flow rate, to reduce this difference.

16 Claims, 4 Drawing Sheets

(56) References Cited

FOREIGN PATENT DOCUMENTS

| | | | |
|---|---|---|---|
| EP | 2974868 | A1 | 1/2016 |
| WO | 2005002860 | A1 | 1/2005 |

* cited by examiner

INSTALLATION FOR THE APPLICATION OF A COATING PRODUCT AND METHOD FOR CONTROLLING SUCH AN INSTALLATION

REFERENCE TO RELATED APPLICATIONS

This application is a U.S. non-provisional application claiming the benefit of French Application No. 22 05743, filed on Jun. 14, 2022, the contents of which are incorporated herein by reference in their entirety.

TECHNICAL FIELD OF THE INVENTION

The present invention relates to an installation for the application of a coating product which comprises a print head equipped with a plurality of nozzles and fed by a source of coating product.

BACKGROUND OF THE INVENTION

In such equipment, each nozzle defines a coating product discharge orifice with a small diameter, in the range of 100 to 300 micrometers (μm). Each nozzle is controlled by a valve, which in turn is fed by the coating product source. The operation of a print head requires a high degree of accuracy in controlling the pressure of the coating product supplied to the print head. This is especially true if the product is viscous, for example with a dynamic viscosity between 50 and 300 milliPascal·seconds (mPa·s).

In an installation for the application of a coating product with a print head, the potentially viscous coating product must be supplied to the individual nozzles with a given supply pressure, for example, equal to 2 bar. In practice, in the case where the nominal pressure of the coating product supply to the print head is 2 bar, if this pressure is higher than 2.1 bar, there is a risk of creating an overspray. Conversely, if the supply pressure is less than 1.9 bar, the instantaneous flow of coating product in one or more nozzles may not allow the formation of a continuous or quasi-continuous net at the nozzle outlet. This is why the precision sought in the coating product feed pressure at the entrance to a print head is of the order of 100 millibars (mbar). However, this supply pressure depends on the instantaneous flow of coating product in the print head.

The instantaneous flow of coating product through the various orifices of the nozzles of the print head results from the opening/closing of the valves which control these various nozzles, and which have a response time of about 1 millisecond (ms). In an installation for the application of a coating product, a source of coating product is used to feed a print head. This coating product source may be constituted of a pressurized coating product tank, or a tank equipped with a piston driven by an electric motor or other equipment. In any case, the response time of such equipment is about 500 ms.

On the other hand, the supply of coating product to a print head from a coating product source takes place through a line which can be several meters long, for example if the print head is arranged at the end of the arm of a multi-axis robot, while the printing source is arranged at the foot of this robot. This line induces regular pressure losses, due to its length and diameter, as well as singular pressure losses, due to the valves, filters and/or elbows arranged along the length of this line.

For all these reasons, the pressure at the inlet of a print head is relatively difficult to manage based solely on the means of controlling the coating product source.

A known solution in the field of ink application consists in making a relatively significant flow of coating product circulate permanently and to take a flow of the order of 10% of this relatively significant flow to feed the nozzles of a print head. This induces a continuous circulation of the ink which is not transposable to the application of a coating product such as paint because the shearing due to the repeated circulation of the coating product would risk deteriorating the paint. In addition, a significant flow of coating product should be fed to the print head, for example equal to 2 liters per minute (l/min) so that 10% of this flow represents approximately 200 ml/min. Bringing 2 l/min of coating product to the end of a robot arm is, in practice, very complicated.

Another solution, which seems obvious but poses integration difficulties because it is bulky, consists of integrating a pressurized product tank or a motorized tank in the immediate vicinity of the print head, or even integrated into the head. #

It is furthermore known from US-A-2019/0337001 to provide a coating product control with two print heads, namely a print head used to apply a coating product and a print head arranged on an exhaust line. It is provided that one of the print nozzles of the exhaust print head is closed when a print nozzle of the print head used to apply the coating product is opened, and vice versa, thus allowing a quasi-constant flow of coating product to be used. This leads to a high consumption of coating product, with significant consequences in terms of reprocessing and cost.

On the other hand, EP-A-2574471 discloses an ink application system in which a print head is fed from a reservoir, through a pump and a sub-reservoir equipped with a flexible wall. The operation of the pump is adjusted depending on a pressure in a passage between the sub-tank and the print head, which does not allow to take into account the ink flow actually ejected by the print head.

It is to these disadvantages, more particularly, that the invention aims to remedy by proposing a new installation for the application of a coating product in which a pressure for supplying a print head with coating product can be precisely controlled, taking into account the respective response times of the valves of the print head and the control members of a coating product source.

SUMMARY OF THE INVENTION

To this end, the invention relates to an installation for the application of a coating product comprising a print head equipped with a plurality of nozzles and supplied by a coating product source, each nozzle being controlled by a valve supplied by the coating product source. In accordance with the invention, the installation comprises a coating product accumulator installed on a circulation circuit for the coating product, which passes through the print head, this accumulator comprising a deformable or movable wall delimiting at least in part a first chamber of variable volume supplied with coating product and a second chamber of variable volume supplied with gas under a predetermined pressure. The predetermined supply pressure for the second chamber of variable volume is equal to a nominal operating pressure of the print head. The first chamber of variable volume is supplied or purged with coating product due to a difference between an instantaneous coating product ejection rate from the print head and a feed rate to the print head from the coating product source. The installation comprises means for detecting a difference between the instantaneous ejection rate and the feed rate. The installation further comprises a control unit configured to adjust an operating setpoint of the coating product source as a function of the difference between the instantaneous ejection flow rate and the supply flow rate, in a direction to reduce this difference between the flow rates.

Thanks to the invention, the accumulator can be sized so that the deformation or displacement of its wall allows to store a volume of coating product sufficient to compensate for a variation in pressure of the coating product at the inlet of the print head, during the response time of the coating product source. The invention also allows to take into account possible variations in pressure drop in a supply line connecting the coating product source to the print head. Since the second chamber of variable volume is supplied with a pressure equal to the nominal operating pressure of the print head and considering the deformable or movable nature of the wall, it can be assumed that the pressure in the first chamber of variable volume is equal to the nominal operating pressure of the print head. Furthermore, the control unit can control the coating product source as a function of the difference between the instantaneous ejection flow rate and the feed flow rate in an optimized manner, reducing this difference, which automatically adapts the coating product flow rate delivered by the source to the flow rate actually ejected by the print head.

According to advantageous but non-mandatory aspects of the invention, such an installation may incorporate one or more of the following features taken alone or in any technically permissible combinations:

- The means for detecting the difference between the instantaneous ejection flow rate and the feed flow rate comprises a sensor, configured to detect a deformation or displacement of the wall of the accumulator, while the control unit is configured to adjust the operating setpoint of the coating product source, depending on an output signal of the sensor.
- The position sensor is of the inductive, capacitive, optical or probe type.
- The means for detecting the difference between the instantaneous ejection flow rate and the feed flow rate comprises a first unit for determining the instantaneous ejection flow rate, a second unit for determining the feed flow rate, and the one control unit is configured to adjust the operating setpoint value as a function of a difference between the instantaneous ejection flow rate determined by the first unit and the feed flow rate determined by the second unit.
- The wall is elastically deformable under normal operating conditions of the installation while, preferably, the wall carries an element the position of which is detectable by the sensor.
- The deformable wall of the accumulator is housed in a rigid shell, while the first chamber of variable volume is defined inside the deformable wall, while the second chamber of variable volume is defined between the deformable wall and the rigid shell, or vice versa.
- The deformable wall is shaped in the form of a sleeve and extends between a first coating product inlet port into the accumulator and a second coating product outlet port from the accumulator.
- The wall is a movable piston that separates the two chambers of variable volume.
- The maximum deformation of the deformable wall, or travel of the movable piston, is compatible with a change in volume of the first chamber of variable volume equal to the sum of the maximum flow rates of the print head nozzles multiplied by the response time of the coating product source.
- The second chamber of variable volume is provided with an outlet opening and the second chamber of variable volume is supplied with a permanent gas flow between a supply line and its outlet opening.
- The accumulator is installed in the circuit, downstream of the print head.
- The accumulator is installed, in the circuit, upstream of the print head.

According to another aspect, the invention relates to a first method for controlling an installation as mentioned above, this method comprises at least steps consisting in:

a) deducing from a deformation or displacement of the wall an information on the direction of evolution of the size of an inner volume of the first variable volume chamber of the accumulator;

b) if the information deduced in step a) corresponds to an increase in the inner volume, adjust the coating product source operating setpoint downward; and c) if the information deduced in step a) corresponds to a decrease in the inner volume, adjust the coating product source operating setpoint upwards.

Advantageously, the operating setpoint is a control pressure of a pressurized tank, a displacement speed of a piston of a chamber with a piston, or a rotational speed of a volume pump.

According to yet another aspect, the invention relates to a second method for controlling an installation as mentioned above, this method comprising at least steps consisting in:

a') calculating a difference between the instantaneous flow rate of coating product through the print head and the feed rate of coating product to the print head;

b') if the difference calculated in step a') is positive, adjusting upward a coating product feed rate setpoint to the print head; and c') if the difference calculated in step a') is negative, adjusting downward a coating product feed rate setpoint to the print head.

BRIEF DESCRIPTION OF THE DRAWINGS

The invention will be better understood, and other advantages thereof will become clearer in the light of the following description of three embodiments of an installation and a method in accordance with its principle, given only by way of example and made with reference to the appended drawings in which:

In FIGS. 2 and 3, thick solid lines are used to represent coating product flow lines, thick dashed lines are used to represent solvent or cleaning product flow lines, thin continuous lines are used to represent air flow lines, and thick dot and dash lines are used to represent electrical conductors for carrying electrical signals.

DETAILED DESCRIPTION

Figure 1:
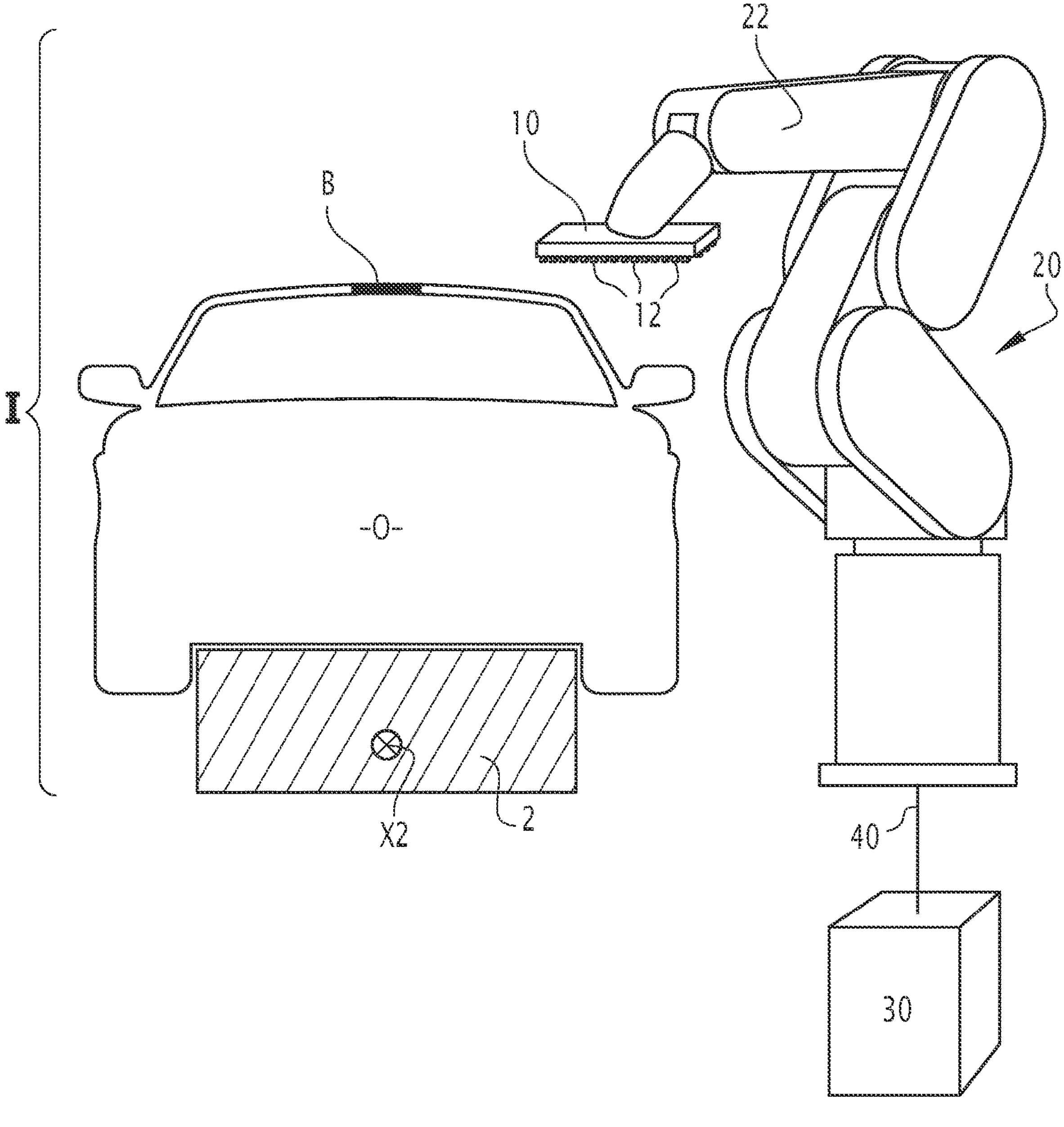
FIG. 1 is a schematic representation of the principle of a coating product application installation in accordance with the invention.
Figure 2:
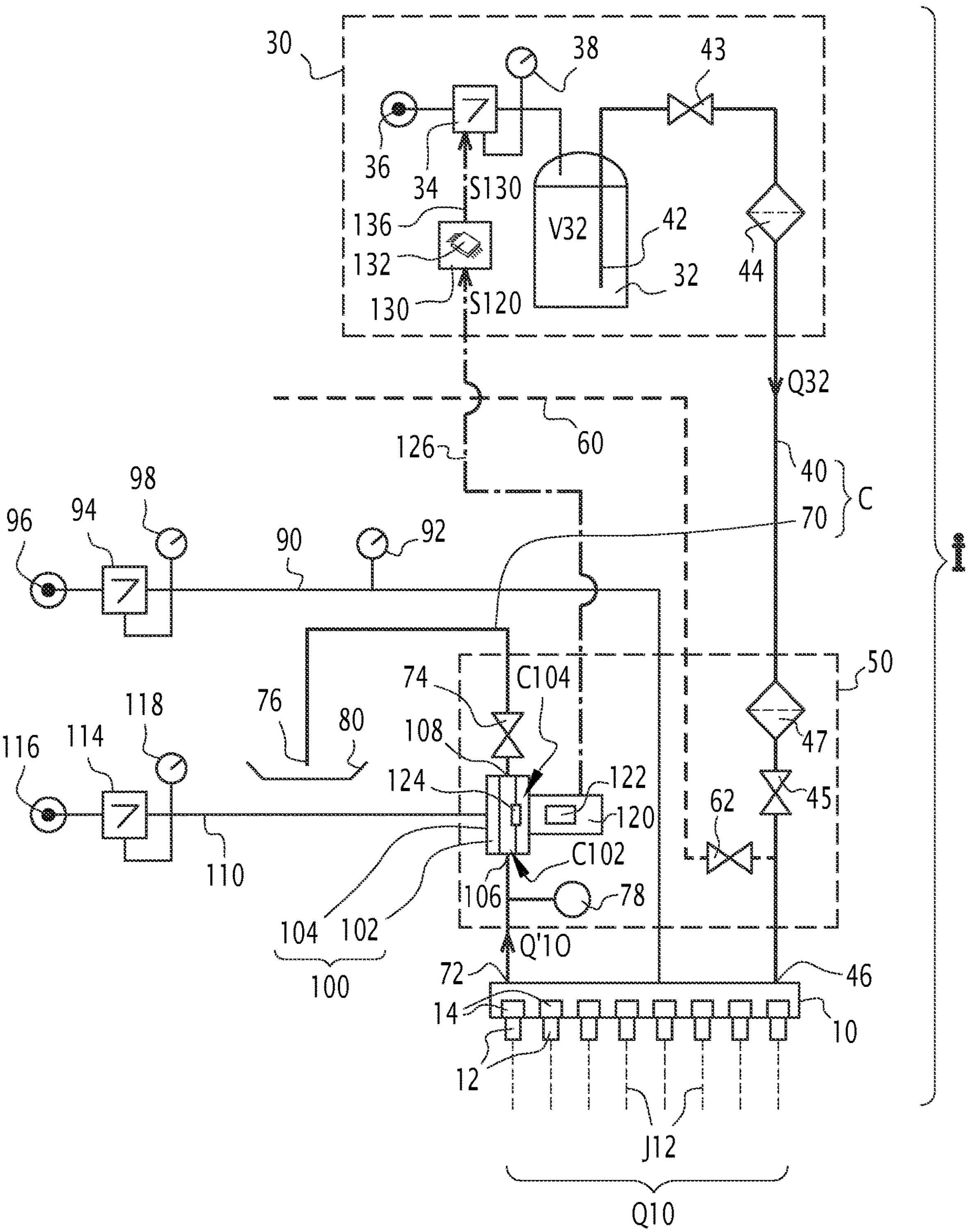
FIG. 2 is a fluid and electrical diagram of the installation of FIG. 1.

The installation I shown in FIGS. 1 and 2 is intended for applying paint to objects O, which in the example of the figures are motor vehicle bodies. More precisely, in this example, the installation I is intended to allow the creation of a band B of contrasting color, for example black, on the roof of a car body.

Alternatively, the objects to be coated may be parts of motor vehicle bodywork, for example bumpers, or, more generally, any object that can be coated, for example a part of an aircraft cabin or a household appliance body, these examples not being limiting.

Furthermore, the coating product applied with the installation I of the invention does not necessarily constitute a contrasting color strip.

This coating product may be a paint, a primer or a varnish or a water-soluble or solvent-based, two-component coating. In particular, its dynamic viscosity can be between 50 and 300 mPa·s.

The installation I comprises a conveyor 2 designed to move the objects O along a conveying axis X2 perpendicular to the plane of FIG. 1.

The installation I also comprises a print head 10 mounted at the end of the arm 22 of a multi-axis robot 20 arranged close to the conveyor 2. The print head 10 is supplied with coating product to be applied from a supply module 30 which comprises a source of coating product to be applied, formed here by a pressurized tank 32.

The module 30 is connected to the print head 10 by a supply line 40 that runs inside the multi-axis robot 20, in particular inside its arm 22.

The module 30 comprises a controlled solenoid valve 34 connected, on the upstream side, to a pressurized air source which delivers air with a pressure equal to 6 bar. On the downstream side, the solenoid valve 34 is connected to the inner volume V32 of the pressurized tank 32. A pressure gauge 38 allows to know the pressure of the air delivered by the solenoid valve 34.

An upstream end 42 of the supply line 40 dips into the pressurized tank. A first shut-off valve 43 and a first filter 44 are arranged on the supply line 40, in its upstream part, inside the supply module 30.

A downstream end of the supply line 40 is connected to the print head 10, which is therefore supplied with coating product from the coating product source, through the supply line 40. The pressure of the coating product at the inlet of the print head depends on the pressure of the coating product supplied from the pressurized tank and the pressure drop in the supply line, which can vary depending on the position of the arm 22.

A control module 50 is arranged close to the print head 10, for example in the arm 22 of the multi-axis robot 20. By "close to" means that the supply module is located less than one meter, preferably less than 50 cm, more preferably less than 20 cm, away from the print head. The supply line 40 passes through the control module 50. At this module 50, the supply line 40 is equipped with a second shut-off valve 45 and a second filter 47.

For example, the first filter 44 can be configured to retain elements with a maximum size greater than 40 μm, while the second filter 47 is configured to retain elements the maximum size of which is greater than 20 μm.

A second supply line 60, for supplying the print head 10 with solvent or cleaning product, is connected to the supply line 40, downstream of the second shut-off valve 45. This supply line 60 is itself equipped with a third shut off valve 62 and connected to a source of solvent not shown, which can be a tank or a closed-loop circulation circuit, sometimes called "circulating".

The print head 10 is equipped with a plurality of nozzles 12, each of which is configured to deliver a jet J12 of coating product to be applied to an object O.

Each nozzle 12 defines a coating product discharge orifice, not shown, the diameter of which is of the order of 100 to 300 μm. Each nozzle 12 is controlled by a valve 14 which is itself supplied with coating product through the supply line 40. The valves 14 may be of the type known from EP-A-2442983 or U.S. Pat. No. 9,638,350, the technical teachings of which are incorporated in the present application by reference.

The valves 14 are electrically or pneumatically controlled in a manner known per se.

A third, discharge line 70 connects the print head 10 to a purge 80. The upstream end 72 of the discharge line 70 is connected to the print head 10, while its downstream end 76 leads to the purge 80. A fourth shut-off valve 74 is mounted on the discharge line 70.

The lines 40 and 70 together form a circuit C that connects the coating product source 32 to the purge 80 and runs through the print head 10.

A fourth line 90 connects a source 96 of pressurized air to the print head 10 and is controlled by a solenoid valve 94 equipped with a pressure gauge 98. A pressure sensor 92 is arranged on the line 90 and allows to control the pressure of supply of the printing head 10 with pressurized air, with a predetermined pressure, for example equal to 2 bar. This pressurized air is used to supply the actuators for opening the nozzles.

An accumulator 100 is arranged on the discharge line 70, in other words, downstream of the print head 10 in the direction of circulation of the coating product between the coating product source 32 and the purge 80. The accumulator 100 is thus installed on the circuit C.

This accumulator 100 comprises a deformable wall 102 and a rigid shell 104 that surrounds the deformable wall.

On the one hand, the deformable wall 102 defines an inner chamber C102 supplied with coating product leaving the print head 10. Given the deformable nature of the wall 102, the inner chamber C102 is of variable volume.

We note respectively Q10 the instantaneous flow rate of coating product ejection by the print head 12, Q32 the flow rate of supply to the print head by the pressurized tank 32 and Q'10 the flow rate of supply to the accumulator 100 by the print head.

We have the relation:

$$Q32=Q10+Q'10 \quad \text{(equation 1)}$$

This can be expressed in the following way:

$$Q'10=Q32-Q10 \quad \text{(equation 2)}$$

From equation 2, it is clear that the flow rate Q'10 can be positive or negative. If the flow rate Q10 is strictly lower than the flow rate Q32, the flow rate Q'10 is positive and the inner chamber C102 of variable volume is progressively supplied with coating product. If the flow rate Q10 is strictly greater than the flow rate Q32, the flow rate Q'10 is negative and the inner chamber C102 of variable volume is progressively purged of the coating product it contains.

On the other hand, a peripheral chamber C104 is defined around the deformable wall 102, inside the rigid shell 104. Given the deformable nature of the wall 102, the peripheral chamber C104 is also of variable volume.

By deformable, it is meant that the wall 102 is elastically deformable, under the effect of a difference in fluid pressure between the chambers C102 and C104, of variable volume under the normal operating conditions of the installation I, particularly in terms of temperature and pressure of the coating product.

Here, the deformable wall 102 is shaped in the form of a sleeve and extends between a first port 106 for entry of the coating product from the print head 10 into the inner chamber C102, in other words, into the accumulator 100, and a second port 108 for discharge of the coating product from the accumulator 100, in the direction of the purge 80.

A pressure sensor 78 allows to detect the pressure of the coating product in the portion of the line 70 connecting the print head 10 and the accumulator 100.

The peripheral chamber C104 is supplied with pressurized air through a fifth line 110 equipped with a controlled solenoid valve 114, the upstream side of which is connected to a source 116 of pressurized air and which is associated with a pressure gauge 118. P104 denotes the supply pressure of pressurized air to the chamber C104, which is determined by the elements 110 to 118. The supply pressure P104 is equal to the nominal operating pressure of the print head 10, namely the pressure that the coating product should have at the inlet of the print head. In particular, the supply pressure P104 of the peripheral chamber C104 with air is equal to the nominal supply pressure of the valves 14 with coating product.

Advantageously, and according to an aspect not shown of the invention, the peripheral chamber C104 includes an outlet opening putting the peripheral chamber C104 in fluid communication with an exhaust, or directly with the environment of the print head, so as to establish a permanent flow circulation of air in the chamber C104 between the line 110 and this outlet opening. This ensures that the pressure in the outer chamber C104 remains at a constant value P104, even during variations in the volume of the inner chamber C102. This allows to avoid the constraints of regulating the pressure supply to the outer chamber C104, which would cause the accumulator 100 to lose response time and performance. Thanks to this permanent circulation at a regulated pressure, the pressure in the peripheral chamber C104 is constant without response time, and the pressure regulation performance at the nozzles is greatly improved.

A sensor 120 is connected to the accumulator 100 and configured to detect deformation of the deformable wall 102. A deformation of the wall 102 corresponds to a situation where the flow rates Q10 and Q32 are different. Thus, the sensor 120 is a mean for detecting a difference between these two flow rates.

For example, the sensor 120 may be an inductive sensor that includes an inductive cell 122 capable of detecting the position of a metal element 124 mounted on a portion of the deformable wall 102. The inductive sensor 120 emits an oscillating electromagnetic field that allows the metallic element to induce eddy currents in response that are detected by the sensor. Thus, the sensor 120 is a position sensor of the portion of the deformable wall 102 that carries the element 124. In this case, the metal element 124 also belongs the to the means for detecting a difference between the flow rates Q10 and Q32.

Alternatively, the sensor 120 is an optical sensor, for example, a laser sensor that measures the distance between the deformable wall 102 and the sensor 120, which allows for the deduction of volume changes of the inner chamber C102. In this alternative, the rigid shell 104 may be transparent if the sensor is placed outside the outer wall. Alternatively, the sensor 120 is another type of optical sensor, such as a camera that measures the deformation of the wall by image analysis, which allows the volume variations of the inner chamber C102 to be deduced.

According to another alternative, the sensor 120 is a capacitive sensor which presents the advantage of not requiring a metallic mass on the deformable wall 102.

According to yet another alternative, the sensor 120 is a probe that comprises a rod that presses against the deformable wall. This type of sensor does not require a metallic mass on the deformable wall 102. The probe rod is advantageously coupled to a linear potentiometer.

The electrical output signal S120 of the sensor 120 is supplied, via a first electrical conductor 126, directly or indirectly to an electronic control unit 130 which itself controls, directly or indirectly thanks to an electrical signal S130, the solenoid valve 34. The electronic control unit 130 is preferably integrated into the power supply module. The control signal S130 is supplied, via a second electrical conductor 136, to the solenoid valve 34 and includes a pressure setpoint value for the pressurized tank 32, in other words a setpoint value of the pressure of the coating product leaving the pressurized tank.

Thus, the value of the air supply pressure setpoint for the pressurized tank 32 is adjusted by the electronic control unit 130 as a function of, in particular, the output signal S120 of the sensor 120 which constitutes a device for determining the difference between the instantaneous ejection flow rate Q10 and the supply flow rate Q32.

The position of the accumulator 100, as close as possible to the print head 10, allows to issue a command for correcting the pressure of the pressurized tank 32, which depends less on the state parameters of the system, such as the temperature, the viscosity of the coating product, and the pressure drop in the supply line, than if this accumulator were distant from the print head. Indeed, during a pressure variation in the print head, the inner chamber C102 changes volume to reach a state of equilibrium as a function of the supply pressure of the peripheral chamber C104. The sensor 120 then measures the deformation of the inner chamber C102.

In response, the electronic control unit 130 emits a pressure correction signal, by increasing or decreasing the supply pressure of the supply line 40, as a function of the volume of the deformable chamber C102, while the pressure in the print head is always the same, regardless of the state parameters of the system. This allows it to be possible, in particular, to limit the need to resort to many sensors of state of the system, and to many steps of calculation in order to adapt the value of the feeding pressure setpoint as a function of these various state parameters. This greatly simplifies the structure of the system, reduces energy consumption, and increases the reliability of the control loop performance.

By measuring the position of the metal element 124, the cell 122 of the sensor 120 detects a deformation of the deformable wall 102 of the accumulator 100.

After a possible calibration, the detected position of the metallic element 124 allows the volume of the inner chamber C102 to be known or estimated.

In particular, the sensor 120 allows the direction of displacement of the metallic element 124 to be known, in other words, to detect when it moves away from or when it moves toward the cell 122, according to a direction of translation of the metallic element 124. An alteration to this position of the metal element according to the direction of translation corresponds to a deformation of the deformable inner wall 102.

It is assumed that the shut-off valve 74 is closed.

In case the metal element 124 moves closer relative to the cell 122, this means that the volume of the inner chamber C102 increases, in other words, coating product tends to accumulate in this inner chamber C102. On the contrary, if the metal element 124 moves away relative to the cell 122, this means that the volume of the inner chamber C102 decreases and the coating product tends to flow from the inner chamber C102 toward the valves 14 of the print head 10.

Normally, the pressure of the coating product exiting the print head 10, as detected by the pressure sensor 78 does not vary. It is the variations in volume of the inner chamber C102 that accommodate the variations in coating product flow into the print head, as a result of the sequential opening and closing of the valves 14. The coating product pressure in the inner chamber C102 is equal to the air pressure in the peripheral chamber C104, since the deformable wall provides a pressure balance between the chambers C102 and C104. In the example of the figures, if the supply pressure to the peripheral chamber is 2 bar, the pressure of the coating product in the inner chamber is also 2 bar. If the coating product from the print head accumulates in the inner chamber C102, this tends to move the metal element 124 closer to the cell 122, which is detected by the sensor 120 and transmitted to the electronic control unit 130 within the signal S120. Otherwise, if the coating product flows from the inner chamber C102 toward the print head, this induces a displacement of the metal element 124 away from the cell 122, which is detected by the sensor 120 and transmitted to the electronic control unit 130 within the signal S120.

The pressure sensor 78 may be used to detect a pressure drift in the first chamber C102 of variable volume and signal such a drift to the control unit 130, by a link, not shown. For example, if a significant amount of coating product reaches the first chamber C102 of variable volume, to the extent that the deformable wall 102 presses against the rigid shell 104, it is no longer possible for the first chamber C102 of variable volume to accept more coating product and the pressure detected by the sensor 78 tends to increase and diverge from the desired nominal value, P104. This can be considered a fault. Conversely, if the pressure detected by sensor 78 decreases from the desired nominal value, P104, a fault is also identified.

The sensor 120 presents a relatively low response time, compared to the response time of the supply module 30, more specifically the pressurized tank 32. For example, in the case of an inductive sensor, the response time of the sensor 120 may be in the order of microseconds, for example between 1 and 100 μs, whereas the response time of the supply module 30, and thus of the source of coating product formed by the pressurized tank 32, is in the order of 500 ms.

The internal volume of the inner chamber C102 varies as a function of the selective opening/closing of the valves 14, with a period of the order of 1 millisecond for a valve. In practice, the print head includes several valves, for example between 40 and 100, and the pressure variations due to the opening and closing of each of these valves appear at periods independent of each other and can lead to pressure variations at a frequency of up to 60 kHz. Indeed, the opening of a valve 14 has the effect of making the coating product circulate through the nozzle 12 associated with this valve, thus reducing the pressure of the coating product upstream of this nozzle.

Furthermore, a synergistic effect is observed thanks to the simultaneous presence of nozzle actuators 14 pneumatically supplied by the third source 96 and the regulation of product supply pressure by means of an accumulator 100 according to the invention. Indeed, the pressure regulation performance of the accumulator 100 allows to correct the response time defects of the paint supply, which allows to avoid too great an imbalance in pressure between the coating product in the nozzles and the supply pressure of the nozzle opening and closing actuators. This excessive imbalance would hamper the closing of the nozzles and could lead to leakage, poor cutting of the deposited drops, and greatly degrade the printing performance. It would then be necessary to control the air supply pressure regulation of the nozzle actuators, which would introduce an additional response time, and which would make the operation of the print head much more delicate. The invention makes it possible, in particular, to avoid these problems.

In addition, the movements of the robot tend to vary the pressure drops in the supply line 40. These different pressure variations result in displacements of the metal element 124 toward/away from the cell 122, which is integrated into the signal S120 and processed by a microprocessor 132 of the electronic control unit 130 to be integrated into the signal S130. Taking account of the respective response times of the sensor 120 and of the supply module 30, the taking into account by the microcontroller 132 of the control unit 130 of the output signal S120 of the sensor 120 does not disturb the control of the module 30 by the unit 130.

On the other hand, the accumulator 100 is advantageously configured so that the maximum deformation of its deformable wall 102 is compatible with a variation in the volume of the inner chamber C102 equal to the sum of the maximum flow rates of the nozzles 12 of the print head 10 multiplied by the response time of the pressurized tank 32. Thus, the inner chamber C102 of the accumulator 100 allows to accommodate the variations in the flow rate of coating product applied by the print head 10, as a function of the selective opening of the valves 14, without significant variation in the pressure P102 in the inner chamber C102, this pressure remaining equal to the pressure P104 in the peripheral chamber C104, which is set to a predetermined value by the elements 110 to 118, as explained above. In other words, assuming negligible hysteresis, the values of pressures P102 and P104 are constant and equal.

Under these conditions, the accumulator 100 can transiently accommodate coating product, when the first chamber C102 of variable volume is supplied with coating product, or expel a certain amount of coating product, when the first chamber of variable volume is purged of coating product, during the phases of adapting a set value of pressure of the pressurized tank 32, while this inner chamber C102 remains at a constant pressure P102, which allows to maintain the supply pressure of the nozzles 14 at this value. Indeed, by neglecting the pressure losses in the section of line 70 located between the elements 10 and 100, the pressure at the outlet of the print head 10 at the upstream end 72 of the line 70, is maintained equal to the pressure P102. This pressure at the outlet of the print head is equal to the pressure in a supply line for the valves 14 provided within the print head 10. The valves 14 are thus supplied with a pressure which can be considered as constant and equal to the pressure P102 or P104.

In an unshown alternative of the first embodiment, the electronic control unit 130 is integrated in an automaton that controls the solenoid valve 34. The electronic control unit then does not increase the cost of the installation I.

Figure 3:
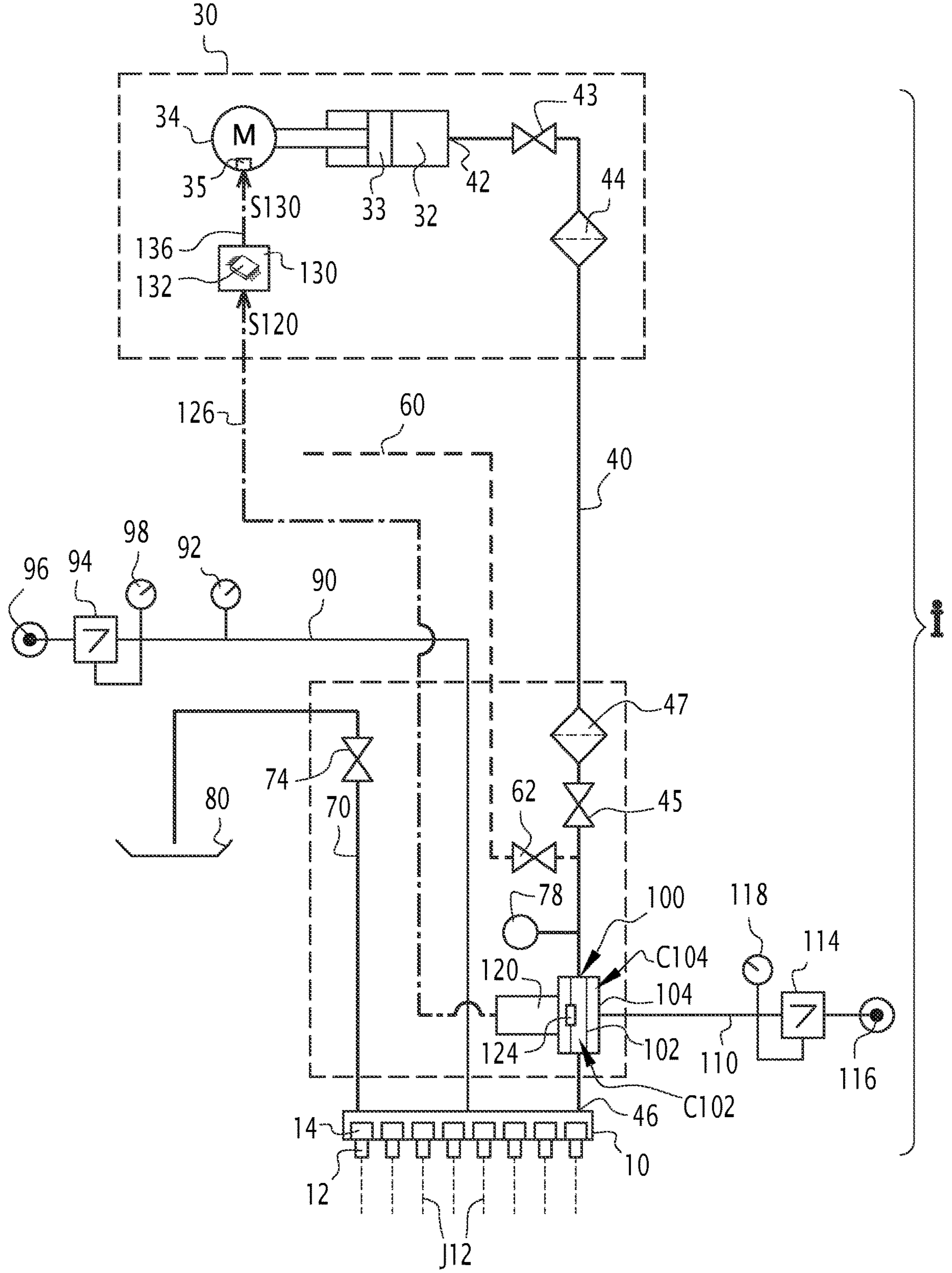
FIG. 3 is a schematic diagram similar to FIG. 2, for an installation in accordance with a second embodiment of the invention.
Figure 4:
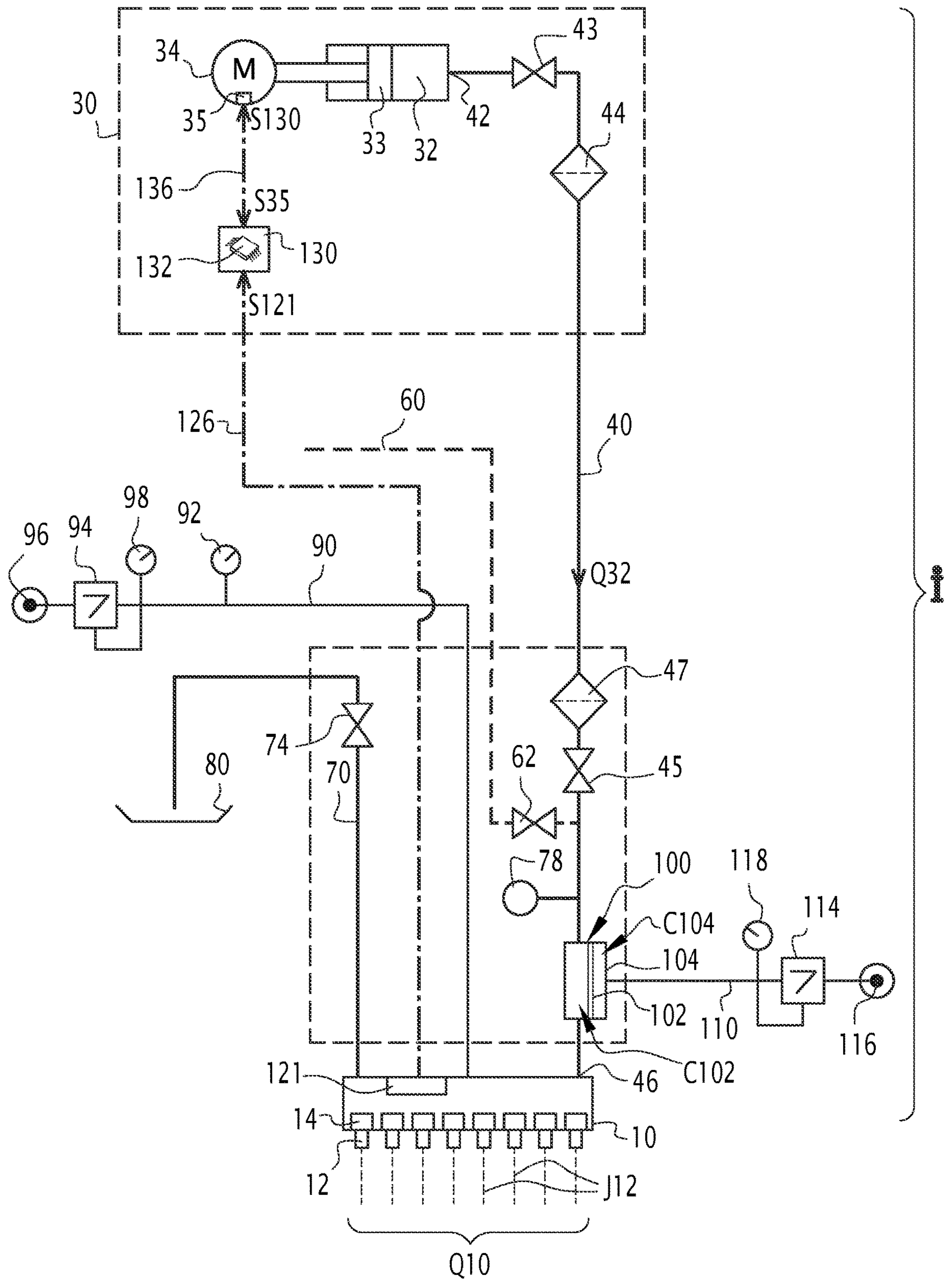
FIG. 4 is a schematic diagram similar to FIG. 2, for an installation in accordance with a third embodiment of the invention.

In the second and third embodiments of the invention shown in FIGS. 3 and 4, the elements similar to those of the first embodiment bear the same references. If an element is shown in these figures without being mentioned in the description, it is the element bearing the same reference in the first embodiment. If an element is mentioned in the description with a reference number, without being identified by that number in these figures, it corresponds to the element bearing the same reference in the first embodiment.

Described below are, mainly what distinguishes these second and third embodiments from the first embodiment.

In the second embodiment, the source of coating product is a tank 32 comprising a piston 33 the displacement of which is controlled by an electric motor 34 driven by an electronic control unit 130, by means of a control signal S130. More precisely, the motor 34 comprises a control card 35, most often referred to as a "variator", which receives operating instructions or set points from the electronic control unit 130, these set points incorporating, in particular, a value for the speed of displacement of the piston 33 or a value for the speed of rotation of the motor 34, which is unequivocally linked to the flow rate Q32 of coating product delivered by the tank 32 to the supply line 40, which is the flow rate for supplying the print head 10 with coating product.

A supply line 40 connects a supply module 30, which includes the tank 32, equipped with a piston, to a print head 10 equipped with nozzles 12 and valves 14. The supply line 40 extends between an upstream end 42 connected to the tank 32, equipped with a piston, and a downstream end 46 connected to the print head 10. A first shut-off valve 43, a first filter 44, a second filter 47, and a second shut-off valve 45 are mounted in series on the supply line 40.

A solvent or cleaning agent is supplied to the print head 10 by means of a second line 60 controlled by a third shut-off valve 62.

A third line 70 connects the print head 10 to a purge 80 and is equipped with a fourth shut-off valve 74.

An accumulator 100 is mounted on the supply line 40, upstream of its second end 46 and comprises, as in the first embodiment, a deformable wall 102 and a rigid shell 104. Thus, the accumulator is mounted upstream of the print head in the circuit C that connects the coating product source tank 32 to the purge 80. An inner chamber C102 and a peripheral chamber C104, both of variable volume, are defined in the accumulator 100, as in the first embodiment. A sensor 120 allows to detect a deformation of the deformable wall 102 and delivers to the electronic control unit 130 a signal S120 representative of the detected deformation, this of a potential difference between the flow rates Q10 and Q32.

A pressure sensor 78 allows to know the pressure in the supply line 40, upstream of the accumulator 100. Alternatively, the pressure sensor 78 is installed on the line connecting the accumulator 100 to the print head 10 and allows to know the pressure in the supply line 40, downstream of the accumulator 100.

A fourth line 90 supplies the valves 14 with pressurized air, from a source 96, being controlled by a solenoid valve 94 associated with a pressure gauge 98. A pressure sensor 92 allows to know the pressure in the line 90. The supply pressure of the valves 14 by the line 90 is considered here as constant and equal to 2 bar, for example.

A fifth line 110 connects a source 116 of pressurized air to the peripheral chamber C104, through a solenoid valve 114 associated with a pressure gauge 118. The supply pressure of the valves 14 through the line 90 is also considered here as constant and equal to 2 bar, for example. Advantageously, the supply pressure of the peripheral chamber C104 with pressurized air is equal to the nominal supply pressure of the print head 10 with coating product.

The first and second electrical conductors 126 and 136 are used to carry signals S120 and S130, as in the first embodiment.

The operation of the system I in accordance with this second embodiment is comparable to that of the first embodiment. In particular, the electrical output signal of the sensor 120 is processed by a microprocessor 132 of the electronic control unit 130 to adjust the electrical signal S130 for controlling the electric motor 34 by taking into account a possible deformation of the deformable wall 102 corresponding to an increase or a decrease in the amount of coating product present in the inner chamber C102.

The sensor 120 of this second embodiment may be of the same type or of a different type than that of the first embodiment.

In either the first or second embodiment, a method for controlling the system I may comprise the following steps:

a) deducing from a deformation or displacement of the wall 102 information on the direction of evolution of the size of the inner volume of the chamber C102 of variable volume;
b) if the information deduced in step a) corresponds to an increase in the inner volume, adjusting downward the operation setpoint of the coating product source 32, which is part of the electrical control signal S130; and
c) if the information deduced in step a) corresponds to a decrease in the inner volume, adjusting the coating product source 32 operation setpoint upward.

No matter which embodiment, the sensor may be an inductive sensor, as explained with reference to the first embodiment. Alternatively, it may be a capacitive sensor, an optical sensor, or a touch probe. Other types of sensor are conceivable.

No matter which embodiment, the functions of the inner chamber C102 and the peripheral chamber C104 may be reversed relative to the example in the figures. In other words, the peripheral chamber C104 can be connected to the print head and supplied with coating product, while the inner chamber is supplied with pressurized air.

The invention is not limited to the case where the deformable wall 102 forms a sleeve that completely surrounds the inner chamber C102. In particular, the deformable wall 102 may only partially delimit the inner chamber C102, the latter being otherwise defined by a rigid wall, as is the case for the peripheral chamber C104 in the examples.

In one alternative shown in FIG. 4, compatible with all the embodiments of the invention, the accumulator 100 presents a substantially spherical or cylindrical outer wall 104 defining an inner volume, and the deformable wall 102 is positioned so as to divide the volume defined by the outer wall 104 into a first chamber C102 and a second chamber C104, one of which being in fluid communication with the print head, the other of which being supplied with control air by the pressurized air source 116. Upon pressure balancing, the deformable wall 102 deforms, and the sensor 120 measures this deformation.

According to another alternative, not shown, of the first and second embodiments, the deformable wall 102 may be replaced by a piston, which is a rigid part. In other words, the wall that separates the chambers C102 and C104 of variable volume is a piston, which allows to improve the accuracy of the measurement performed by the sensor 120 because the volume change and the piston displacement are linear. Such an approach requires establishing a seal between the two chambers C102, C104, of variable volume, which is not necessary with a deformable wall. In this case, the movements of translation of the piston allow the pressures P102 and P104 respectively in the two chambers C102 and C104 to be balanced.

When the wall 102 is deformable, it can be made of elastomer, for example of FKM (fluorocarbons) or FFKM (perfluoroelastomer) or of any other elastically deformable product such as a rubber, possibly with a tetrafluoroethylene coating to ensure the chemical resistance of the rubber to the coating products.

In the third embodiment shown in FIG. 4, the chambers C102 and C104 of variable volume are separated by a wall 102 that deforms, in the event of a transient pressure difference between these chambers, causing the pressures P102 in chamber C102, P104 in chamber C104 to balance as soon as an imbalance occurs. Unlike the first and second embodiments and the above-mentioned alternative with a piston, the position of the wall 102 is not detected by a sensor of the type of the sensor 120.

In this third embodiment, the instantaneous flow rate Q10 of coating product ejection from the print head is determined. This can be done by assuming that the size and/or mass of the coating product droplets exiting the nozzles 12 are known, by measurement or after calibration. As a non-limiting example, a control unit 121 integrated into the print head 10 can be used to determine the number of openings/closings of the valves 14 over a given period of time. Assuming that each opening/closing releases a droplet, the number of droplets ejected over the period, therefore the flow rate Q10, is known. The control unit does not have to count the number of openings/closings because it is known from the control signal received by the control unit 121. This number is transmitted to the electronic control unit 130 within an output signal S121 of the control unit 121, which transits through an electrical conductor 126. The microprocessor 132 is then able to calculate the instantaneous flow rate Q10.

Alternatively, the instantaneous flow rate Q10 is calculated in the control unit and transmitted to the electronic control unit within the signal S121.

Alternatively, the control unit 121 can be replaced by another device for determining the instantaneous flow rate Q10, by direct or indirect measurement.

On the other hand, the flow rate Q32 from the outlet of the tank 32, which is the theoretical flow rate for feeding the coating product to the print head 10, is calculated by the control card 35, as a function of the displacement speed of the piston 33, which is unequivocally linked to the rotation speed of the motor 34.

On the other hand, the electronic control unit 130 receives a signal S35 from the electronic card 35 of the electric motor 34 which includes the flow rate Q32.

The electronic units 35, 121 or equivalent allow detecting when the flow rates Q10 and Q32 are different. Thus, they constitute means for detecting the difference between the instantaneous ejection flow rate Q10 and the supply flow rate Q32.

It is then possible for the microprocessor 132 to compare the flow rates Q10 and Q32 and to regulate the flow rate Q32 to adjust it to the flow rate Q10. In other words, the microprocessor 132 can calculate a difference between the flows Q10 and Q32. If the flow rate Q10 is strictly greater than the flow rate Q32, the electronic control unit 130 controls the motor 34 by increasing the flow rate Q32 set point. If the flow rate Q10 is strictly less than the flow rate Q32, the electronic control unit 130 controls the motor 34 by decreasing the flow rate setpoint Q32.

Thus, particularly in the case of a supply module 30 with a motor/piston or a gear pump, in other words, in the case of volume dosing, it is possible to regulate the feed rate Q32 as a function of the instantaneous flow rate Q10 of the print head which operates at constant pressure.

In this third embodiment, the accumulator 100 is used only to absorb, in other words, compensate for, transient variations in flow rate and pressure, while regulation is performed by the control unit 130, based on the cumulative volume deviations of ejection Q10 and supply Q32.

This third embodiment requires knowing the size and/or mass of the droplets to determine the instantaneous volume Q10, therefore the difference between the flow rates Q10 and Q32 to be compensated by the accumulator 100. Knowing the size of the droplets is more complicated than measuring a displacement as in the first and second embodiments but remains feasible because this size or mass can be determined optically, by means of a device that allows the droplets to be measured prior to application, or by measuring the total quantity with each coating product.

In this third embodiment, the pressure sensor 78 functions as in the first embodiment, which is all the more important because deformations of the deformable wall are not detected, in the absence of a sensor 120.

In an alternative of this third embodiment, the flow rate Q32 is calculated in the control unit 130.

In the alternative of the first and second embodiments where the wall 102 is replaced by a piston and/or in the third embodiment, it is advantageously provided that the maximum stroke of the piston is compatible with a variation of the volume of the first chamber C102 of variable volume equal to the sum of the maximum flow rates of the nozzles 12 of the print head 10 multiplied by the response time of the coating product source 32.

Alternatively, in the second and third embodiments, the electronic control unit 130 and the control card 35 are merged into a single electronic device, advantageously integrated into the motor 34. In this case, the signal S120 or S121 is supplied directly to the motor and the motor operating setpoint is generated within this electronic device.

Alternatively, and regardless of the embodiment, the source of coating product may be different from the examples shown in the figures with reference 32. For example, it may be a gear pump, a pressure regulator supplied at a pressure higher than the print head supply pressure, which regulates the supply pressure of the supply line 40.

The value of the control pressure P104 can be, for example, of the order of 2 bar, and can be adjusted as a function of the viscoelastic properties of the coating product, the temperature, and the state parameters of the system.

Alternatively, the pressurized air sources 36, 96, and 116 may be combined into a single common pressurized air source.

Alternatively, at least one of the signals S120, S121, and S130 is transmitted over a wireless path.

According to another alternative, also not shown, of the invention, the circuit C is a closed loop for circulation of the coating product, with return of the coating product from the outlet 108 of the first chamber C102 of variable volume toward the tank 32.

According to another alternative, also not shown, of the invention, the coating product tank 32 is included in the print head 10 or arranged in the immediate vicinity of this head, downstream of the second filter 47. In this case, the influence of pressure losses in the arm 22 of the robot 20 is minimized.

According to another alternative, not shown, of the invention, the coating product source is a volumetric pump. In this case, the operating setpoint value delivered by the electronic control unit is a value of the speed of rotation of this pump.

According to an alternative applicable to all the embodiments, the second chamber C104 of variable volume can be supplied with a pressurized gas other than air, for example nitrogen.

The embodiments and alternatives contemplated above may be combined with each other, in the framework of the annexed claims.

The invention claimed is:

1. An installation for the application of a coating product comprising a print head equipped with a plurality of nozzles and supplied by a source of coating product, each nozzle being controlled by a valve supplied by the source of coating product, the installation comprising:

- a coating product accumulator installed on a circuit for the circulation of the coating product, which passes through the print head, comprising a deformable or movable wall delimiting, at least in part, a first chamber of variable volume supplied with coating product and a second chamber of variable volume supplied with gas, under a predetermined pressure, wherein the predetermined pressure for supplying the second chamber of variable volume is equal to a nominal operating pressure of the print head, and wherein the first chamber of variable volume is supplied or purged with coating product due to a difference between an instantaneous coating product ejection rate from the print head and a supply rate to the print head from the coating product source;
- means for detecting a difference between the instantaneous ejection rate and the supply rate; and
- a control unit configured to adjust an operating setpoint value of the coating product source as a function of the difference between the instantaneous ejection flow rate and the supply flow rate, in a direction to reduce this difference between the flow rates.

2. The installation according to claim 1, wherein said means for detecting the difference between the instantaneous ejection flow rate and the supply flow rate comprises a sensor, configured to detect a deformation or a displacement of said deformable or movable wall of the accumulator, and wherein said control unit is configured to adjust the setpoint value for operation of the source of the coating product, as a function of an output signal of said sensor.

3. The installation according to claim 2, wherein said sensor is of the inductive, capacitive, optical or probe type.

4. The installation according to claim 1, wherein said means for detecting the difference between the instantaneous ejection flow rate and the supply flow rate comprises:

- a first unit for determining the instantaneous ejection flow rate; and
- a second unit for determining the supply flow rate, and wherein said control unit is configured to adjust the operating setpoint value as a function of a difference between the instantaneous ejection flow rate determined by said first unit and the supply flow rate determined by said second unit.

5. The installation according to claim 1, wherein said deformable or movable wall is elastically deformable under the normal operating conditions of the installation.

6. The installation according to claim 5, wherein said deformable or movable wall carries an element the position of which is detected by said sensor.

7. The installation according to claim 5, wherein said deformable or movable wall is housed in a rigid shell, wherein the first chamber of variable volume is defined inside said deformable or movable wall, and wherein the second chamber of variable volume is defined between said deformable or movable wall and the rigid shell, or vice versa.

8. The installation according to claims 5, wherein said deformable or movable wall is in the shape of a sleeve and extends between a first port for entry of coating product into said accumulator and a second port for discharge of coating product from said accumulator.

9. The installation according to claim 1, wherein said deformable or movable wall comprises a movable piston that separates the two chambers of variable volume.

10. The installation according to claim 9, wherein the maximum deformation of said deformable or movable wall or the displacement stroke of said movable piston is compatible with a variation in the volume of the first chamber of variable volume equal to the sum of the maximum flow rates of the nozzles of the print head multiplied by the response time of the coating product source.

11. The installation according to claim 1, wherein the second chamber of variable volume is provided with an outlet opening and wherein the second chamber of variable volume is supplied with a permanent gas flow, between a supply line and its outlet opening.

12. The installation according to claim 1, wherein said accumulator is installed, in the circuit, downstream of the print head.

13. The installation according to claim 1, wherein said accumulator is installed, in the circuit, upstream of the print head.

14. A method for controlling a coating product application installation according to claim 2, comprising

- deducing from a deformation or a displacement of the deformable or movable wall of the accumulator of the installation, information on the direction of evolution of the size of an inner volume of the first chamber of variable volume of the accumulator;
- if the information deduced in in said deducing corresponds to an increase in the inner volume, adjusting the value of the operating setpoint of the coating product source downward; and
- if the information deduced in said deducing corresponds to a decrease in the inner volume, adjusting the value of the operating setpoint upward.

15. The method according to claim 14, wherein the operating setpoint is a control pressure of a pressurized tank, a displacement speed of a piston of a tank equipped with a piston, or a rotational speed of a volume pump.

16. A method for controlling an installation for application of a coating product according to claim 4, comprising:

- calculating a difference between the instantaneous flow rate of coating product through the print head and the flow rate of coating product supplied to the print head;
- if the difference calculated in said calculating is positive, adjusting upward a coating product feed rate setpoint of the print head; and
- if the difference calculated in said calculating is negative, adjusting downward a coating product feed rate setpoint of the print head.

* * * * *